United States Patent
Keightly (10) Patent No.: US 7,163,362 B2
(45) Date of Patent: *Jan. 16, 2007

(54) HOLE SAW ASSEMBLY

(76) Inventor: Kym John Keightly, 5 Vincenzo Street, Fairview Park, South Australia (AU) 5126

(*) Notice: Subject to any disclaimer, the term of this patent is extended or adjusted under 35 U.S.C. 154(b) by 212 days.

This patent is subject to a terminal disclaimer.

(21) Appl. No.: 10/861,400

(22) Filed: Jun. 7, 2004

(65) Prior Publication Data

US 2004/0247405 A1 Dec. 9, 2004

(51) Int. Cl.
*B23B 51/04* (2006.01)

(52) U.S. Cl. ............ 408/204; 408/239 R; 279/77

(58) Field of Classification Search ............ 408/204, 408/206, 207, 209, 703, 238, 239 R; 279/77, 279/78, 79, 80, 89; B23B 51/04
See application file for complete search history.

(56) References Cited

U.S. PATENT DOCUMENTS

| | | | | |
|---|---|---|---|---|
| 2,779,361 A | * | 1/1957 | McKiff | 408/204 |
| 3,267,975 A | * | 8/1966 | Enders | 408/200 |
| 3,854,840 A | * | 12/1974 | Miyanage | 408/208 |
| 3,973,862 A | * | 8/1976 | Segal | 408/204 |
| 5,108,235 A | * | 4/1992 | Czyzewski | 408/204 |
| 5,352,071 A | * | 10/1994 | Cochran et al. | 408/204 |
| 2004/0179911 A1 | * | 9/2004 | Keightley | 408/204 |

FOREIGN PATENT DOCUMENTS

| | | | |
|---|---|---|---|
| JP | 08243824 A | * | 9/1996 |
| WO | WO 2003024677 A1 | * | 3/2003 |
| WO | WO 2004082875 A1 | * | 9/2004 |
| WO | WO 2004085104 A1 | * | 10/2004 |

* cited by examiner

*Primary Examiner*—Daniel W. Howell
(74) *Attorney, Agent, or Firm*—O. M. (Sam) Zaghmout; Bio Intellectual Property Service LLC (57) ABSTRACT

A hole saw assembly including a boss adapted to hold a hole saw and having a plurality of connecting shafts. The shafts rotationally engage a driving means and longitudinally engage a locking member that locks the boss, driving means and the locking member together. This is achieved by the driving means and the locking member having co-axially aligned cutouts allowing for the insertion of the shafts. The locking member is moveable between two positions in one the cutouts engaging the shafts and in the other allowing for free longitudinal movement of the shafts.

9 Claims, 7 Drawing Sheets

HOLE SAW ASSEMBLY

PRIORITY

This application claims the benefit of an Australian Application Number: 2003902866, filed Jun. 6, 2003, which is incorporated herein in its entirety by reference.

BACKGROUND OF THE INVENTION

1. Field of Invention

The present invention relates to an improved hole-saw assembly and in particular, to a unique means of releasably locking a hole saw to a mandrel.

2. Background of the Invention

Hole-saws typically consist of a flat base, which provides support for a cylindrically shaped member protruding therefrom that includes cutting teeth at its circular end. The base is generally locked by a drill mandrel and includes a central bore through which a pilot drill, also locked by the mandrel, may pass.

The current applicant is the owner of various Australian and International Patent applications dealing with the quick and easy mounting and demounting of a hole-saw to a drill mandrel, and also of various connection means between a hole-saw and a mandrel. For example, International ApplicationPCT/AU02/01296 entitled 'An improved hole-saw assembly', the contents of which are incorporated by referenced herein, discloses the use of a hole-saw base including two shafts adapted to extend through the drill mandrel that are then locked by a locking member that moves between two positions. Typically the movement is a rotational one, the member being a rotatable annulus. Thus in one position the hole saw base is locked to the mandrel and in the other it is not, enabling the hole saw base and thus the hole saw to be easily and quickly removable from the mandrel.

Although the above hole saw assembly works well, in some instances different ways other than rotational motion of locking the hole saw to the mandrel may be preferred. Further in some instances it would be preferred if the locking mechanism was shielded to avoid contamination by dirt and other material.

It is therefore an object of the present invention to provide for a hole saw assembly including a locking means that overcomes at least some of the above-mentioned problems or provides the public with a useful alternative.

SUMMARY OF THE INVENTION

Therefore in one form of the invention there is proposed a hole-saw assembly including:

a hole-saw having at one end a plurality of cutting teeth and at the other end two shafts;

a mandrel coaxially aligned with said hole-saw and including a body having two bores therethrough coaxially aligned with said shafts;

a locking member forming part of said mandrel and including two cutouts, said locking member moveable from a first to a second position, wherein in said first position said locking member cutouts are aligned with said bores and said shafts allowing said shafts to be freely insertable and removable and in said second position said cutouts being misaligned thereby locking said shafts to said mandrel.

In preference said locking member is biased to said second position. This is typically achieved by the use of a spring.

In preference said locking member movement is a sliding movement across said mandrel.

In preference said assembly includes a base from which therein extend the two shafts said base including a mounting means for mounting of a hole-saw thereon. Of course, the base may have two mounting means to accommodate two hole saw of different diameter.

In preference said hole-saw includes a threaded inner bore adapted to engage a threaded outer projection extending from said base.

In preference said shafts include a flute adjacent said outer end and a cap on said outer end, the cap having an inner surface adapted to engage the locking member when said locking member is in said second position to thereby lock the shafts from longitudinal movement from the locking member.

In preference said hole-saw assembly includes a drill-bit mounted on said mandrel, said drill-bit extending through and beyond said hole-saw.

In preference said cutouts are holes. Thus the locking member includes holes disposed within the member.

In preference said locking member is a semi-circle including an inner edge, said cutouts defined on said inner edge.

In preference said locking member includes two split-rings biased towards each other and defining said cutouts therein between, each of the split rings movable to a second position in opposing directions to thereby allow for the removal of said shafts.

BRIEF DESCRIPTION OF THE DRAWINGS

The accompanying drawings, which are incorporated in and constitute a part of this specification, illustrate several implementations of the invention and, together with the description, serve to explain the advantages and principles of the invention.

In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
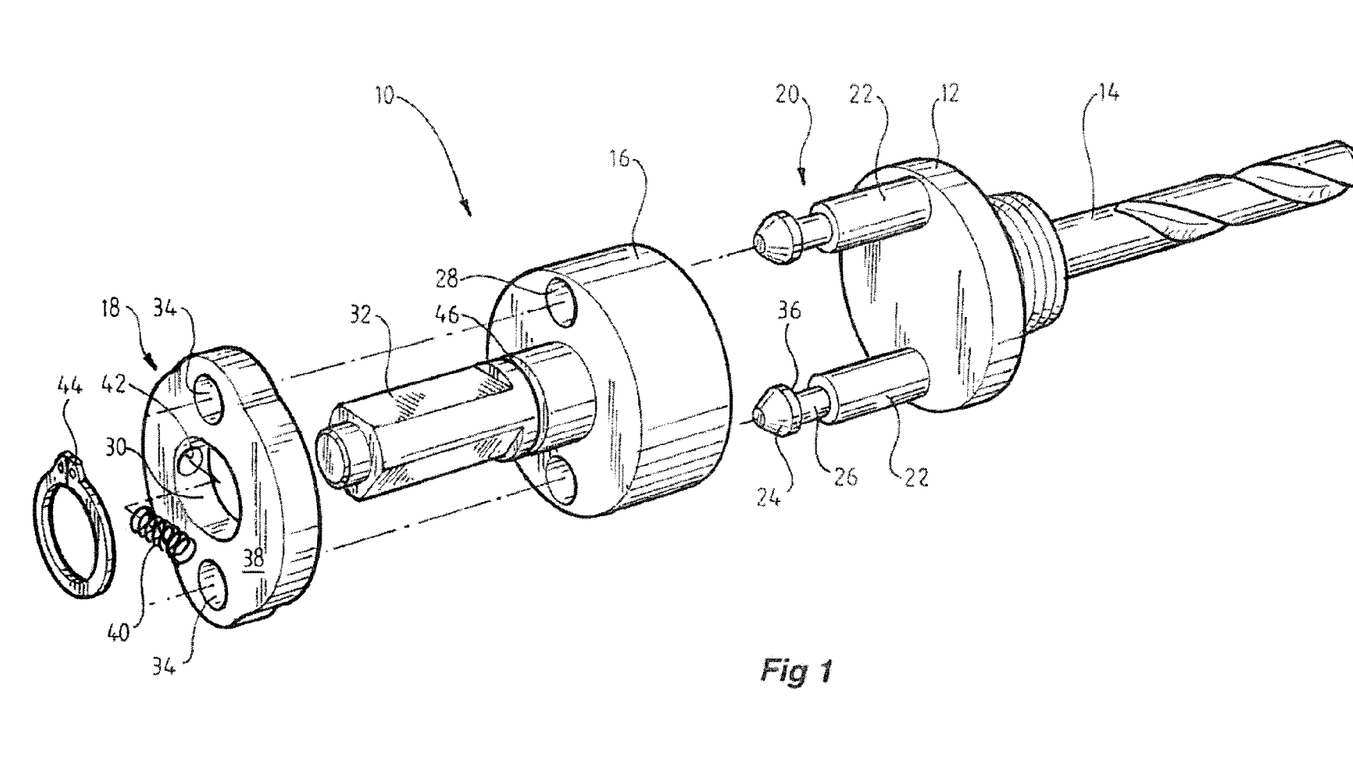
FIG. 1 is an exploded isometric view of a hole-saw assembly embodying the present invention and including a slidable locking member.

FIG. 1 illustrates a hole saw assembly 10 including a threaded base 12 adapted for a hole saw to be screwed thereto, a drill bit 14, mandrel 16 and locking member 18.

Extending adjacent the edge of the base 12 and in an opposite direction to drill bit 14 are two identical and spaced apart shafts 20. However it is to be understood that although it is advantageous to have two shafts, only one is required.

Each shaft 20 includes column 22 extending from the base 12 and including a tapered outer end 24 adjacent to which is a groove 26. The columns are adapted to be inserted into co-axial bores 28, the depth of the bores 28 such that when the shafts 20 are inserted into the mandrel 16, the groove 26 and the tapered end 24 of each shaft protruding beyond the mandrel 16.

Locking member 18 is located on top of the mandrel 16 and includes a central aperture 30 through which passes mandrel shaft 32 that is typically inserted into a drill or the like to provide the rotational driving force. Locking member 18 also has two co-axial bores 34 into which pass the tapered ends 24 and groove 26 of each shaft 20. The depth of bores 34 is such that the underside flute 36 of the tapered ends 24 (defined by groove 26) extend above the top surface 38 of the member 18.

Figure 2:
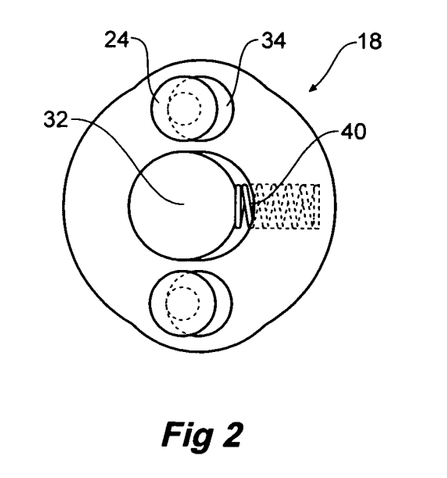
FIG. 2 is a top view of the hole saw assembly illustrating the locking member of FIG. 1 in a locked position.

The locking member includes a biasing means or spring 40 held in cavity 42 that forces the bores 34 to be misaligned with the shafts, the locking member then engaging the shafts by sliding into part of the groove 26, as illustrated in FIG. 2. In use, the user inserts shafts 20 though mandrel 16 and into bores 34 of the locking member 18. The tapered end 24 of the shafts 22 act against the spring 40 forcing the locking member bores 34 to be in aligned with the shafts 22 (FIG. 3) enabling the shafts to enter the bores 34. However, as soon as the tapered ends 24 pass beyond the outer surface 38 of the locking member 18, it snaps back into its biased position. This causes the underside flute 36 to now rest on the top surface 38 preventing the shafts from disengaging the member 18. Quite obviously, the central hole 30 has to be somewhat enlarged to allow for this sideways movement. Further the locking member 18 is retained in position by the use of appropriate means such as circlip 44 engaging groove 46 on shaft 32.

Figure 3:
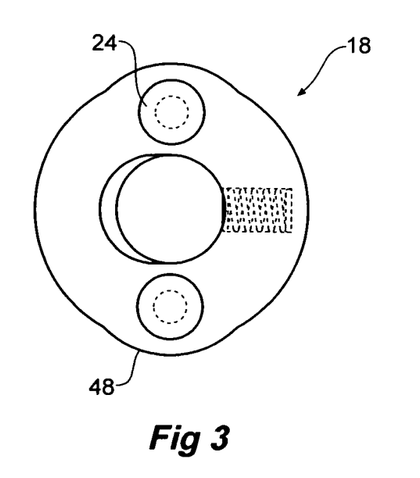
FIG. 3 is a top view of the assembly as in FIG. 2 but when in an unlocked position.
Figure 4:
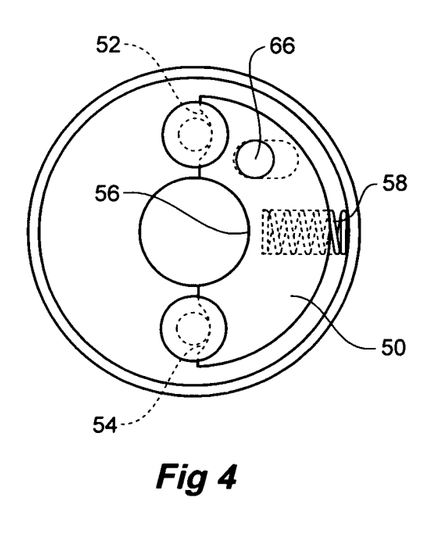
FIG. 4 is a top view of a hole saw assembly illustrating an alternate configuration of a locked locking member.
Figure 5:
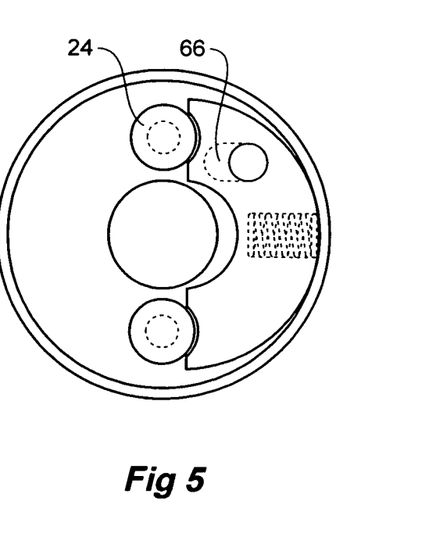
FIG. 5 is a top view of the assembly of FIG. 4 but when in an unlocked configuration.
Figures 6, 7:
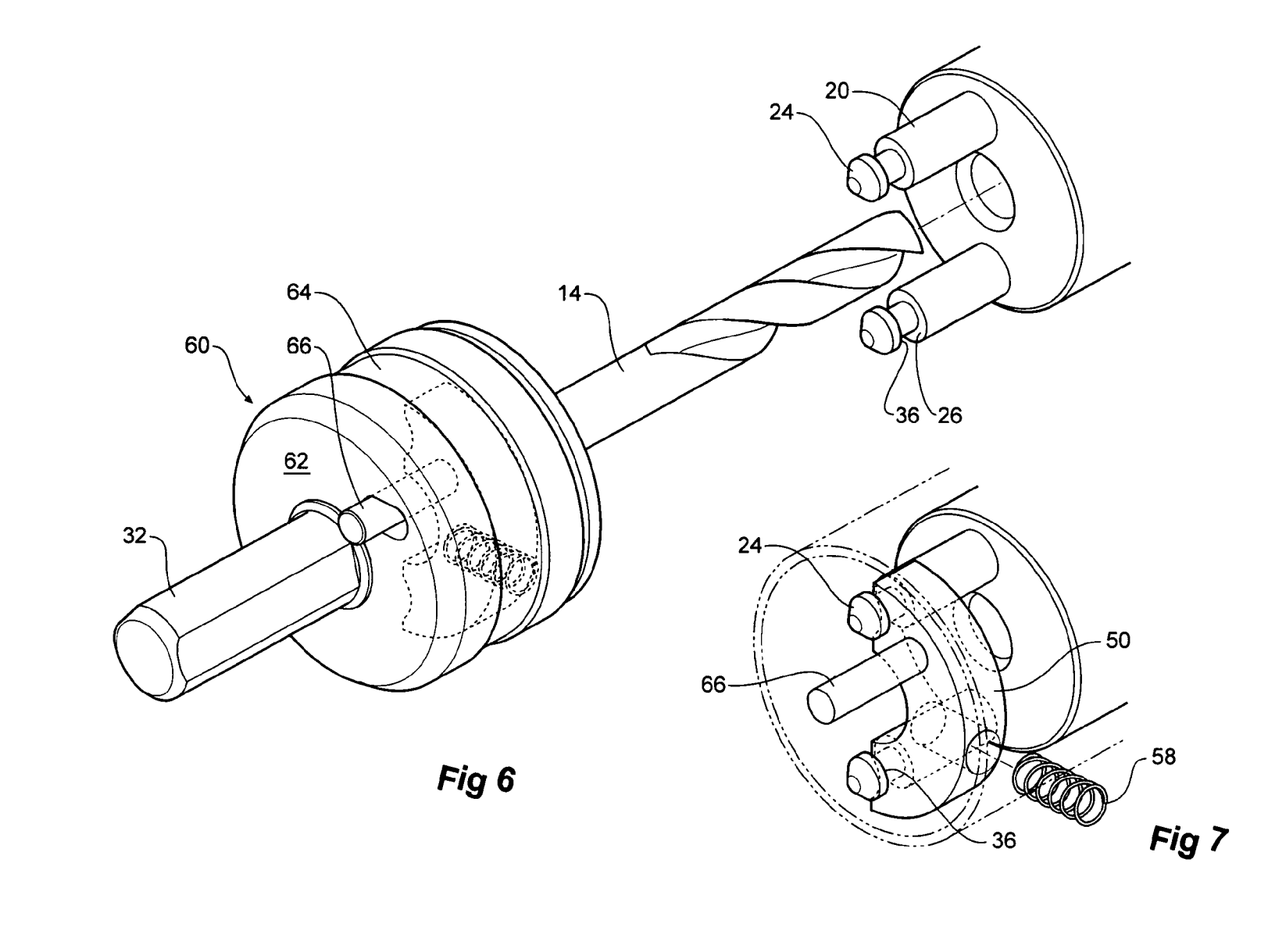
FIG. 6 is a perspective exploded view of the hole saw assembly of FIGS. 4 and 5.
FIG. 7 is a perspective view of the assembly of FIG. 6 but when in an engaged configuration.
Figure 8:
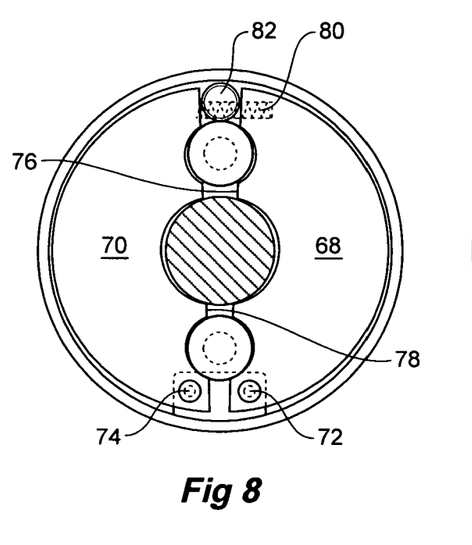
FIG. 8 is a top view of yet another embodiment of a locking member used in a hole saw assembly and when in a locked configuration.
Figure 9:
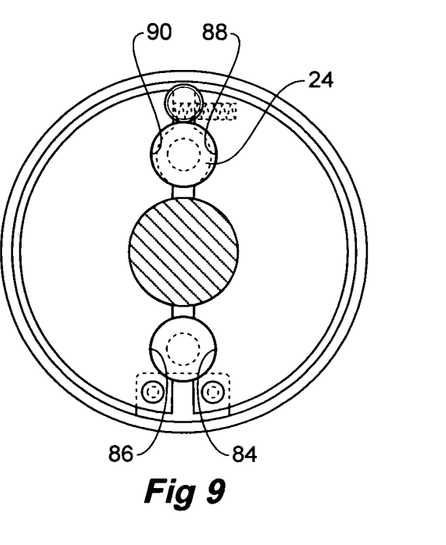
FIG. 9 is a top view of the assembly of FIG. 6 but when in an unlocked configuration.
Figure 10:
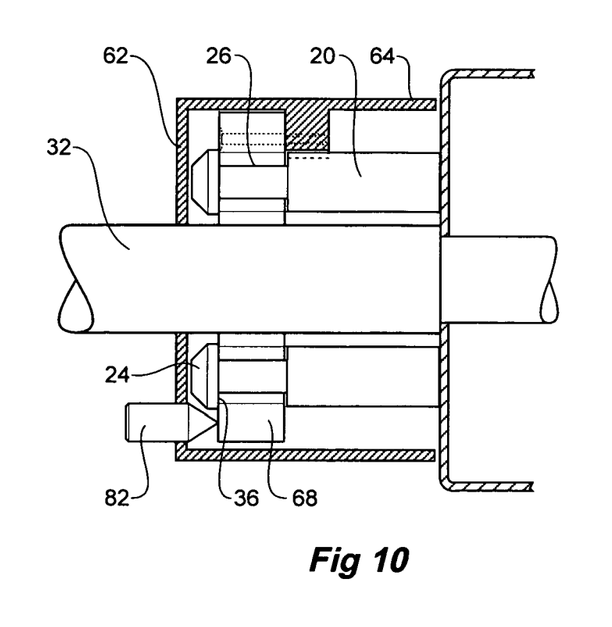
FIG. 10 is a side and cross-sectional view of the assembly of FIGS. 6 and 7.
Figures 11, 12:
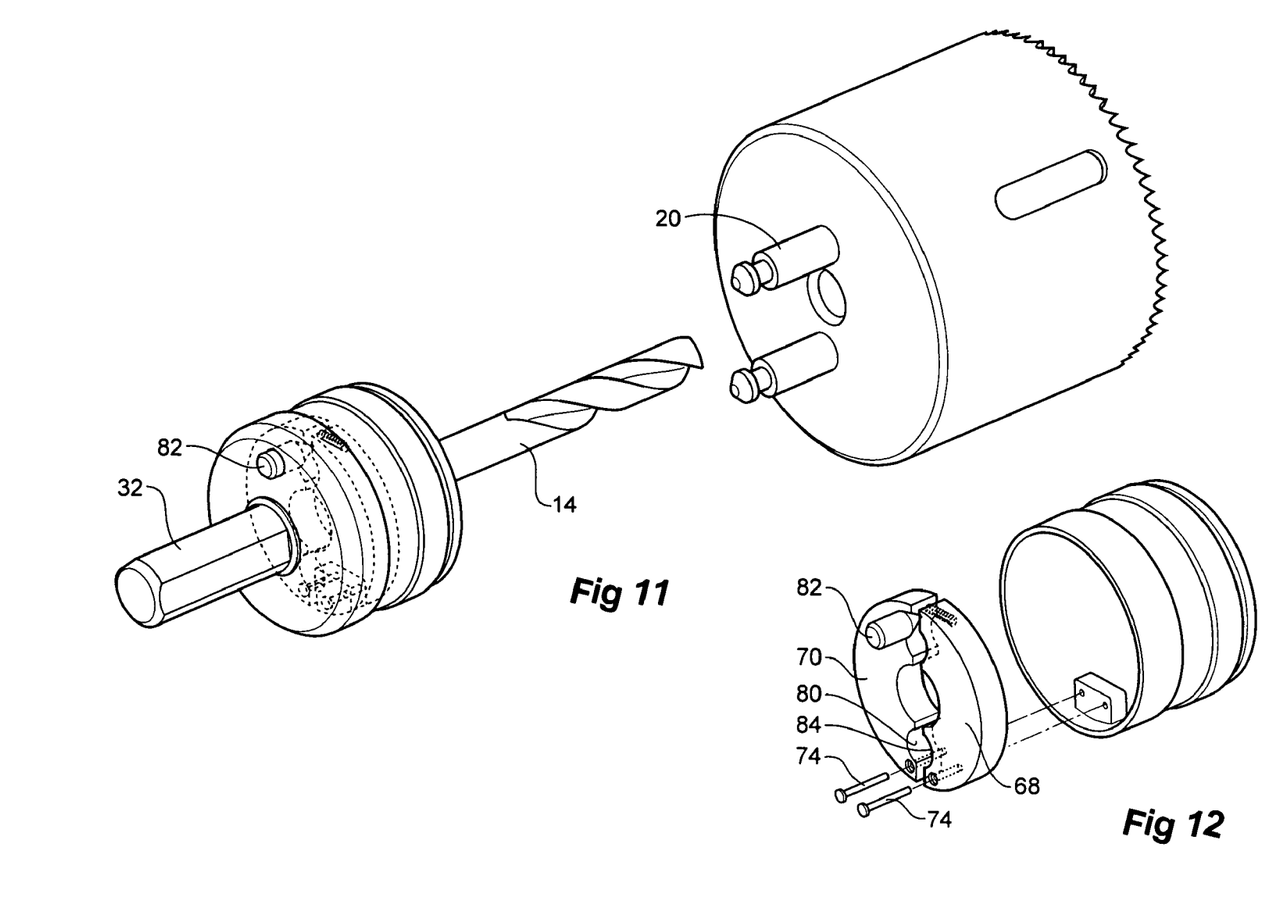
FIG. 11 is a perspective view of a hole saw assembly using a locking member as in FIGS. 8–10.
FIG. 12 is a partial exploded perspective view of the hole saw assembly of FIGS. 8–11.

The release the assembly, one simply needs to grab hold of the locking member 18 and slide it sideways until the bores 34 of the member 18 are aligned with the shafts allowing them to be withdrawn from the member 18 and mandrel 16. To assist in the sliding motion the member 18 may include parallel and oppositely spaced protrusions 48.

Illustrated in FIGS. 4 to 7 is an alternate embodiment of a locking member 50. The locking member has effectively been halved to be now a half-toroid or a half-ring structure. The member 50 includes three circular cutouts 52, 54 and 56, cutouts 50 and 52 accommodating the shafts 20 whilst cutout 56 the mandrel shaft 32. The half-ring 50 is biased by spring 58 into a locking position and is held in place by a cover 60 including a top surface 62 and skirt 64, the skirt being of varying diameter to assist in gripping the cover. A projection 66 attached to half-ring 50 enables it to be moved for operation of the half-ring, cover 62 including a slit 66 to accommodate for this movement. Thus the reader will appreciate that in the biased or locked position, the half-ring upper surface engages the underside 36 of the tapered ends by sliding into the groove 26 of each shaft. In this embodiment, and mainly for illustrative purposes, the drill bit 14 is shown attached to the mandrel rather than to the base to which is attached the hole saw.

In an alternate embodiment and as illustrated in FIGS. 8 to 12 the locking member includes two split rings that are hinged to be operable in clamp type configuration. Thus two split rings 68 and 70 are rotatably fixed around pivot pins 72 and 74 respectively at an adjacent end. The rings are slightly spaced apart by a distance equal to the diameter of the groove 26 of shafts 20 so that when in the locked position the inner edges 76 and 78 of the two splint rings 68 and 70 are effectively parallel. The split rings are biased in this position by the use of a spring 80. To disengage the split rings from the shafts 20 a tapered pin 82 is pushed into the gap between the split rings at their free ends. This causes the split ring to open up pivoting around pivots 72 and 74. The reader should appreciate that since the slit rings open wider at their free ends, the size of the shaft cutouts 84 and 86 (FIG. 9) at the pivoted ends is somewhat larger than the cutouts 88 and 90 at their free ends.

Figure 13:
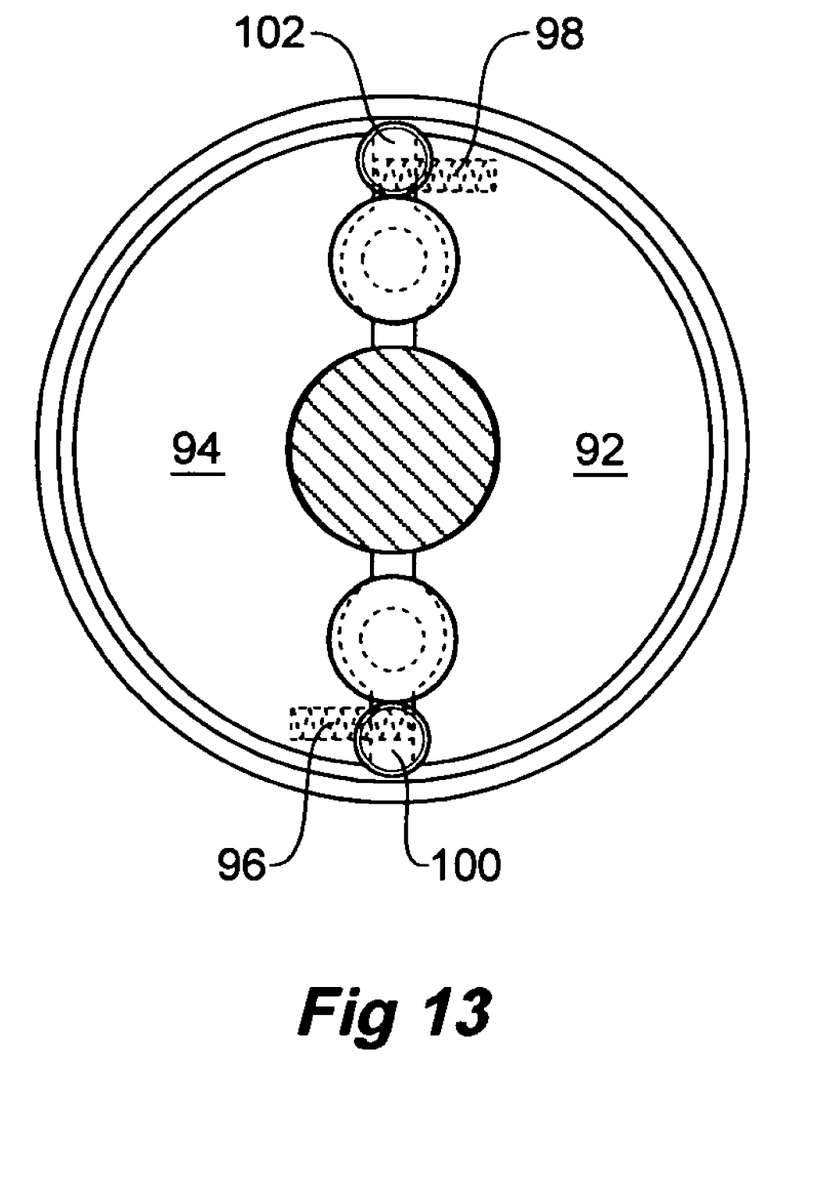
FIG. 13 is a top view of yet another embodiment of a locking member used in a hole saw assembly and when in a locked configuration.

In an alternate configuration of the split ring arrangement as illustrated in FIG. 13 there could indeed be two split-rings 92 and 94 that are biased together with springs 96 and 98 and that otherwise operate the same as the locking members above. To open up the locking member two tapered pins 100 and 102 are forced in between the ends of each split ring 92 and 94.

Figure 14:
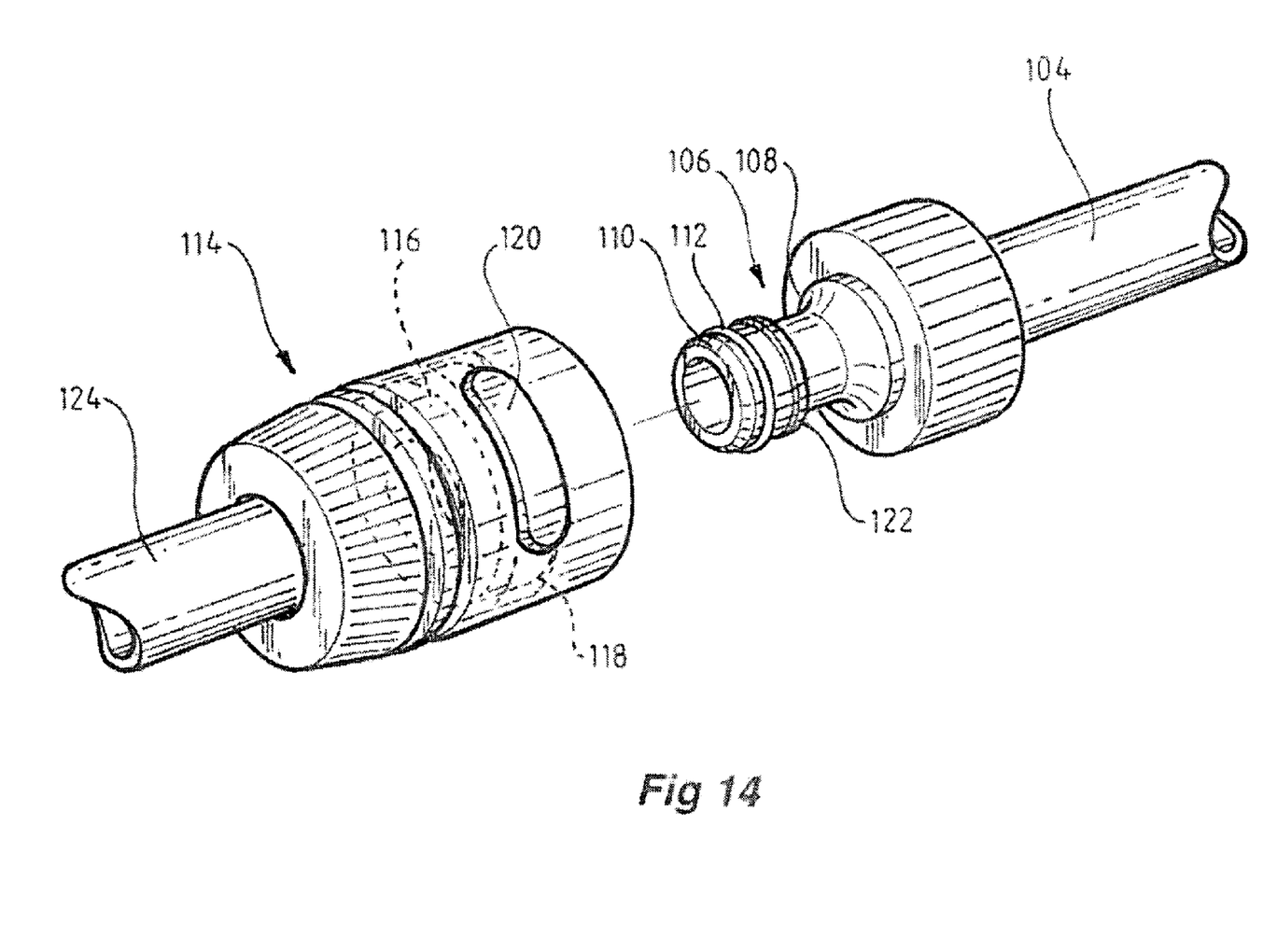
FIG. 14 is a perspective view the locking member as per the present invention when used to mechanically couple and alternate item, such as a garden hose.

The reader should now appreciate the advantages of the present invention by the use of a locking member that moves or slides so as to lock a part having a specially configured shaft. Although the above description has revolved around the locking and releasing of a hole saw assembly the present invention may very well be used in numerous other applications. As illustrated in FIG. 14, the above invention may be used to couple two hoses. Thus first hose 104 includes a shaft 106 including a groove 108 and a tapered front 110 including sealing ring 112. The shaft 104 is adapted to be inserted into a female socket 114 including a first member 116 that engages the seal 112 to ensure that the coupling does not leak. A second slidable locking member 118 that is operable by side button 120 is configured so that in its biased position its upper surface engages the underside 122 defined by groove 108 preventing the shaft from disengaging the female member 114 hose 104 to a slidable locking member 116. Since the first member includes a central bore it allows hose 104 to be fluidly connected top hose 124. By operating button 120, the two are caused to be disengaged.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. A hole-saw assembly including:
   a hole-saw having at one end a plurality of cutting teeth and at the other end two shafts;
   a mandrel coaxially aligned with said hole-saw and including a body having two bores therethrough coaxially aligned with said shafts;
   a locking member forming part of said mandrel and including two cutouts, said locking member moveable from a first to a second position, wherein in said first position said locking member cutouts are aligned with said bores and said shafts allowing said shafts to be freely insertable and removable and in said second position said cutouts being misaligned thereby locking said shafts to said locking member.

2. A hole-saw assembly as in claim 1 wherein said locking member is biased to said second position.

3. A hole-saw assembly as in claim 1 wherein said locking member movement is a sliding movement across said mandrel.

4. A hole-saw assembly as in claim 1 wherein said assembly includes a base from which therein extend the two shafts, said base including a mounting means for mounting of a hole-saw thereon.

5. A hole-saw assembly as in claim 4 wherein said hole-saw includes a threaded inner bore adapted to engage a threaded outer projection extending from said base.

6. A hole-saw assembly as in claim 1 wherein said shafts include a flute adjacent said outer end and a cap on said outer end, the cap having an inner surface adapted to engage the locking member when said locking member is in said second position to thereby lock the shafts from longitudinal movement from the locking member.

7. A hole-saw assembly as in claim 1 including a drill-bit mounted on said mandrel, said drill-bit extending through and beyond said hole-saw.

8. A hole saw assembly as in claim 1 wherein said locking member is two split-rings biased towards each other and defining said cutouts therein between, the split rings movable to a second position in opposing directions to thereby allow for the removal of said shafts.

9. A hole saw assembly as in claim 1 wherein said locking member is a semi-circle including an inner edge, said cutouts defined on said inner edge.

* * * * *

UNITED STATES PATENT AND TRADEMARK OFFICE
CERTIFICATE OF CORRECTION

PATENT NO. : 7,163,362 B2  Page 1 of 1
APPLICATION NO. : 10/861400
DATED : January 16, 2007
INVENTOR(S) : Kym John Keightley It is certified that error appears in the above-identified patent and that said Letters Patent is hereby corrected as shown below:

In last name of the inventor:
"Keightly" should read; --Keightley--

Signed and Sealed this

Tenth Day of April, 2007

JON W. DUDAS
*Director of the United States Patent and Trademark Office*